United States Patent [19]
Little

[11] Patent Number: 5,826,430
[45] Date of Patent: Oct. 27, 1998

[54] FUEL HEATING SYSTEM USED IN CONJUNCTION WITH STEAM COOLED COMBUSTORS AND TRANSITIONS

[75] Inventor: David A. Little, Oviedo, Fla.

[73] Assignee: Westinghouse Electric Corporation, Pittsburgh, Pa.

[21] Appl. No.: 636,430

[22] Filed: Apr. 23, 1996

[51] Int. Cl.[6] ................................................. F02C 7/224
[52] U.S. Cl. ............................................ 60/736; 60/39.75
[58] Field of Search ............................ 60/39.182, 39.53, 60/39.55, 39.75, 39.83, 736, 39.465, 39.54, 39.58, 39.59; 415/114

[56] References Cited

U.S. PATENT DOCUMENTS

| | | | |
|---|---|---|---|
| 2,770,097 | 11/1956 | Walker | 60/39.58 |
| 3,038,308 | 6/1962 | Fuller | 60/736 |
| 5,255,505 | 10/1993 | Cloyd | 60/39.55 |
| 5,491,971 | 2/1996 | Tomlinson et al. | 60/39.182 |

FOREIGN PATENT DOCUMENTS

| | | |
|---|---|---|
| EP-0-391-082 | 10/1990 | European Pat. Off. . |
| GB-2-131-094 | 6/1984 | United Kingdom . |
| WO-A-9608643 | 3/1996 | WIPO . |

*Primary Examiner*—Louis J. Casaregola
*Attorney, Agent, or Firm*—D. G. Maire

[57] ABSTRACT

A system is disclosed that provides for a more efficient combined cycle turbine system by using heated coolant returning from the gas turbine engine to pre-heat fuel before that fuel is injected into the combustor. Coolant, such as steam, that is used to cool gas turbine combustors and/or transitions carries high grade heat energy that was removed from the top cycle. By returning the heat energy to the incoming fuel, energy is recovered at a more efficient rate than would result from recovering that heat energy in the bottom cycle.

5 Claims, 2 Drawing Sheets

FUEL HEATING SYSTEM USED IN CONJUNCTION WITH STEAM COOLED COMBUSTORS AND TRANSITIONS

FIELD OF THE INVENTION

The invention relates to energy recovery systems for use with turbine engines. More particularly, the invention relates to a system for transferring energy to fuel from steam that was used to cool gas turbine combustors and transitions.

BACKGROUND OF THE INVENTION

Improving the efficiency of power generation systems is a incessant goal of practitioners in the power generation system arts. Perhaps the most significant technique for improving efficiency of power generation is through the use of a combined cycle system. In a combined cycle system, exhaust heat from a first system, referred to as the top cycle, is used to generate power in a second system, referred to as the bottom cycle. Such combined cycle systems typically employ a gas turbine engine in the top cycle, and a steam system in the bottom cycle. A heat recovery steam generator converts the hot exhaust gas from the gas turbine engine into useful steam to drive one or more steam turbines.

Developers of power generation systems have additionally recognized that putting as much energy as possible into the top cycle yields the greatest energy efficiency in combined cycle systems. Energy put into the top cycle reaps the benefit of delivering energy to both the top and the bottom cycle. On the other hand, energy put solely into the bottom cycle delivers energy to only one cycle—the bottom. In current high-efficiency power generation systems, for example, energy input at the top cycle is recovered at approximately a 58 percent rate from the combined efficiency of the top and the bottom cycle. By comparison, energy put into only the bottom cycle is recovered at a significantly lower 43 percent rate.

In addition to efficiency, cooling the turbine engines in the power system is also of critical importance. In particular, the combustors and transitions of gas turbine engines are exposed to extreme heat and require substantial cooling. For example, conventional gas turbine engines have flame temperatures in the combustor that reach 1550° C. To provide adequate component cooling, turbine engine designers have used film cooling of combustors and transitions with pressurized air. As a result of such film cooling techniques, turbine inlet temperatures fall substantially lower than flame temperatures (e.g., approximately 1350° versus 1550° C.). However, reducing the turbine inlet temperature in this way has the unfortunate side effect of decreasing power generation system efficiency. But, 1550° C. is the theoretical limit for 9 ppm dry low $NO_x$ (oxides of nitrogen) combustion flame temperatures—the current industry requirement. To raise efficiency, combustor and transition cooling designs are migrating to closed systems in which the coolant is not bled into the gas path, but rather circulates around the component, thus allowing a 150° increase in turbine inlet temperature without raising flame temperature.

In closed systems, coolant may comprise steam, water, or air. Where steam is the selected coolant, it is often removed from the bottom cycle, i.e., from the heat recovery steam generator, and used to cool components in the turbine engine. After cooling the combustor and transition, the steam is routed to a steam turbine where useful energy is recovered.

Applicant has recognized that routing the steam to the bottom cycle imposes a penalty on the amount of heat energy recovered. By not recovering the heat energy in the top cycle, high grade heat energy is removed from the top cycle and recovered by the bottom cycle via a steam turbine. Thus, there is a need for a system of returning the high grade heat energy removed from the combustors and transitions to the top cycle.

SUMMARY OF THE INVENTION

The present system meets the need above by using heated coolant returning from the gas turbine engine to preheat fuel before that fuel is injected into the combustor. Such a system comprises a coolant supply. A component in the turbine engine having a liner such that coolant flowing through the component surrounds it and absorbs heat in the component generated by the hot gas path. That liner has an inlet for receiving coolant from the coolant supply and an outlet for coolant to exit the liner. The system also has a heat exchanger that has a flow path for coolant and a separate flow path for fuel. Coolant flows from the component liner outlet and into the heat exchanger. Simultaneously, fuel flows through the heat exchanger in route to the turbine engine combustor. Within the heat exchanger, heat from the coolant is transferred to the fuel.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF A PREFERRED EMBODIMENT

Figure 1:
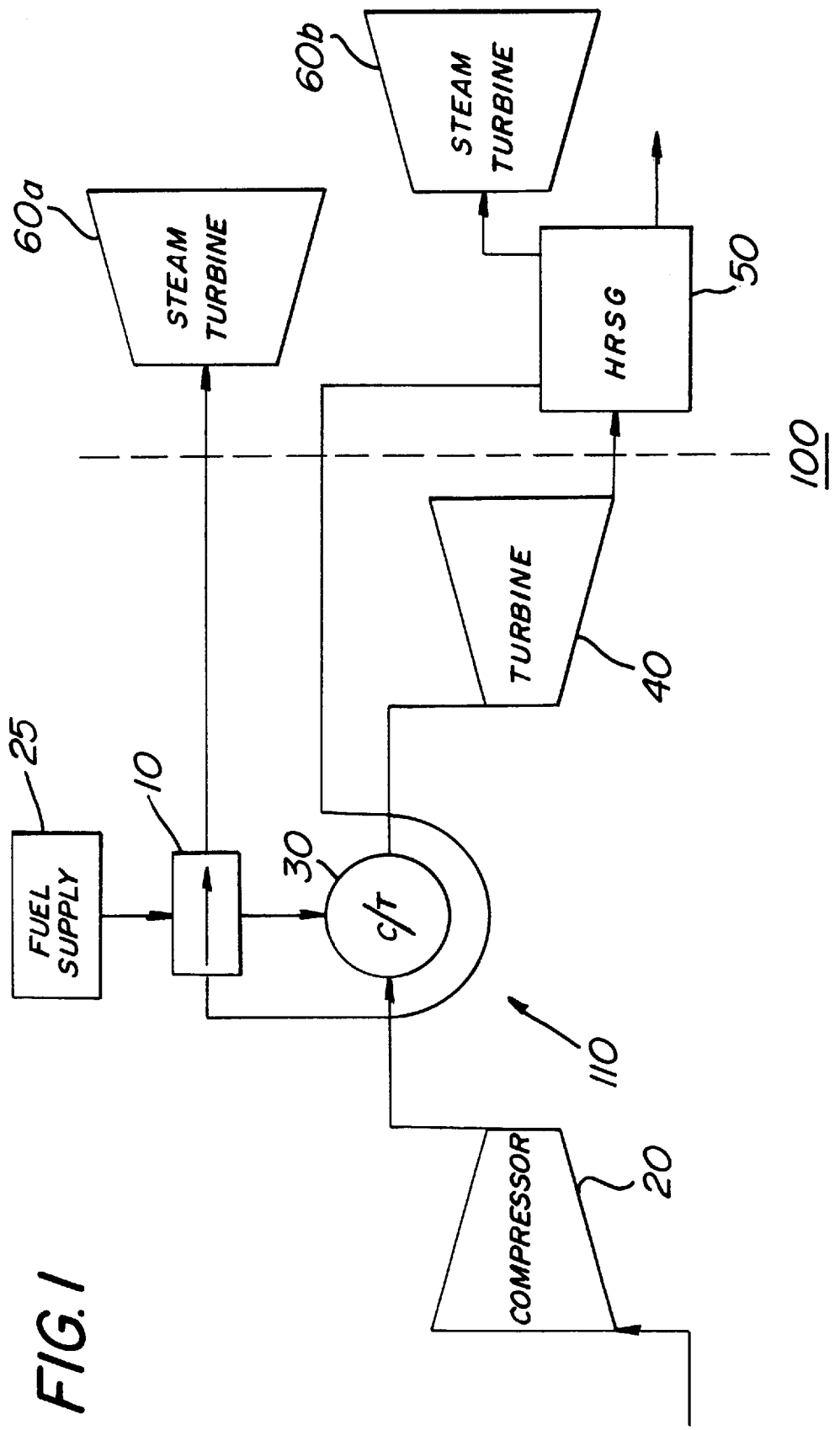
FIG. 1 is a schematic diagram of a combined cycle generation system with steam cooled combustor/transitions employing the present invention.

Referring now to the drawings wherein like numerals indicate like elements throughout, FIG. 1 presents a schematic diagram of a combined cycle power generation system 100 wherein the present invention is employed. The top cycle consists of gas turbine engine 110 and the bottom cycle consists of heat recovery steam generator (HRSG) 50 and steam turbines 60. The fuel supply 25 provides the energy source to the system 100. Fuel from supply 25, initially, powers the gas turbine 110. To further enhance the overall system efficiency, hot gas exiting the turbine 40 as exhaust is converted to steam by HRSG 50. That steam is used to power steam turbines 60.

According to a presently preferred embodiment of the present invention, the combustors and transitions 30 are cooled by steam provided from the HRSG 50. However, it should be understood that the source of the steam used to cool the combustors and turbines 30 can be from any accessible source. Additionally, notice that the combustors and transitions are represented by a single element 30 in the Figures. Significantly, the invention envisions the use of steam that was used to cool a transition, a combustor, or a combined combustor/transition. Thus, they are represented in the Figures as a single element. The steam enters the liner of the combustors and transitions and cools the walls of the combustors and transitions by absorbing heat. If the heat absorbed by the steam were delivered directly to the bottom cycle, i.e., the steam turbine 60, the energy transferred to the coolant would be recovered at only the bottom cycle efficiency.

The present invention can be better understood by reference to a exemplary implementation; however, it should be appreciated that all the numbers used herein for temperatures, efficiencies and the like are for illustration purposes and are not intended to limit the invention. In an exemplary steam-cooled gas turbine engine, the temperature of the cooling steam entering the combustor and transition liners approaches 650° F. After the steam travels through and exits the liner, the temperature will have risen to approximately 1050° F. According to an aspect of the present invention, a portion of that energy (i.e., the additional heat added to the steam) is recovered in the top cycle. Thus, according to a presently preferred embodiment, a heat exchanger 10 is inserted into the system 100. This heat exchanger 10 transfers some of the heat energy in the steam to the fuel that enters the top of the cycle via fuel supply 25.

Figure 2:
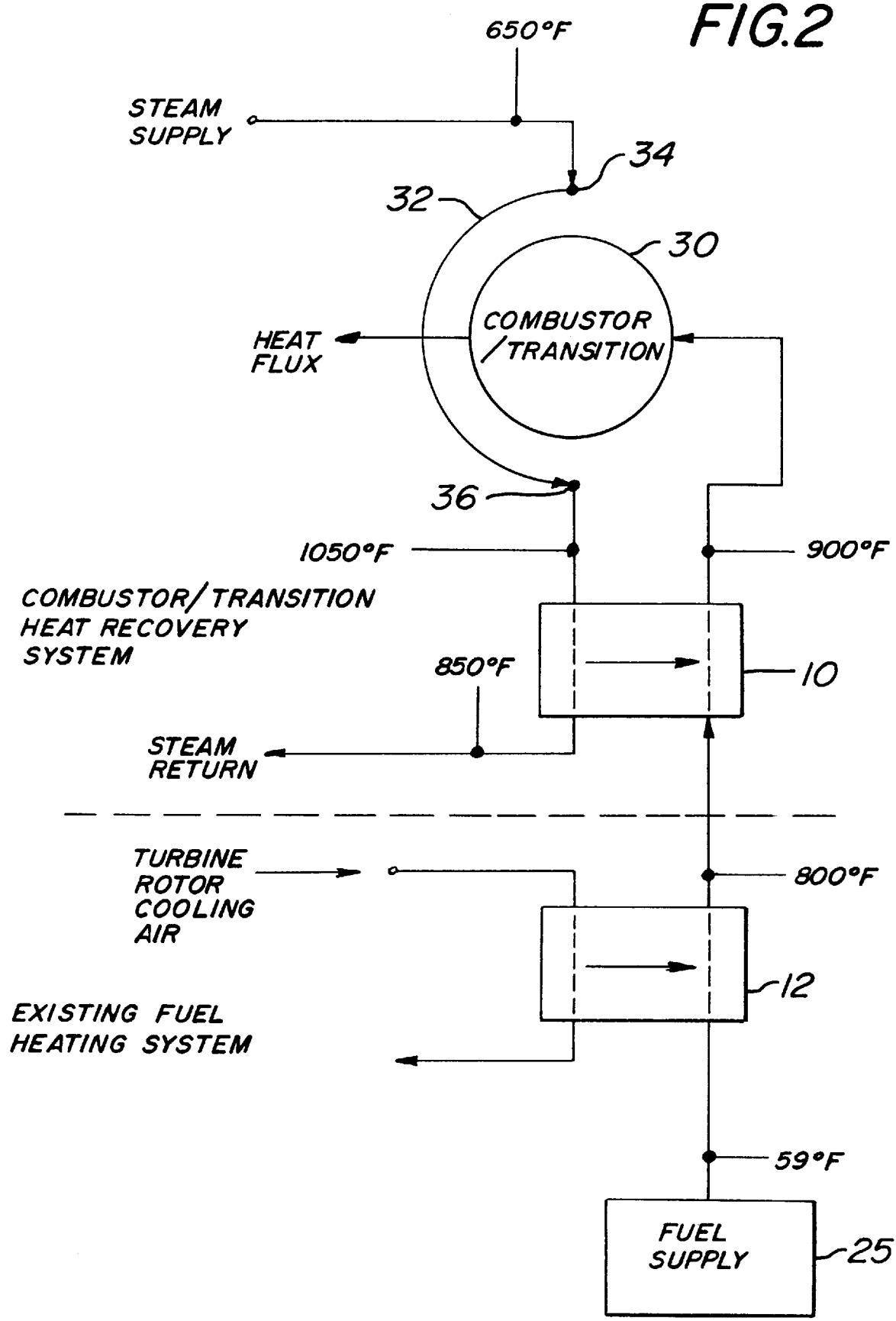
FIG. 2 is a block diagram of the combustor/transition coolant circuit wherein the present invention is employed.

Referring now to FIG. 2, a block diagram of the system for transferring high grade heat in the steam to the fuel is depicted. Initially, the fuel is supplied to the system at a predetermined temperature. As shown in the example of FIG. 2, the fuel leaves the fuel supply 25 at approximately 59° F. After leaving the fuel supply 25, the fuel may enter any conventional gas fuel heating system 12. Conventionally, such systems 12 will raise the temperature of the fuel to approximately 800° F. After exiting heating system 12, the fuel enters the heat exchanger 10 of the present invention. Coincidentally, steam, with a temperature of approximately 650° F., enters the liner 32 of the combustors and transitions 30 of the gas turbine engine 110 via inlet 34. The heat flux from the walls of the liner 32 increases the steam temperature to approximately 1050° F. The steam then exits the liner 32 via outlet 36. The steam then enters the heat exchanger 10, raising the temperature of the fuel to approximately 900° F. While raising the temperature of the fuel to 900° F., the temperature of the steam will decrease to approximately 850° F.

The heat exchanger 10 is of a type well-known in the art for exchanging heat between separate isolated fluids such as a compact printed circuit board construction.

The present invention may be embodied in other specific forms without departing from the spirit or essential attributes thereof; for example, a similar technique could be utilized to preheat the fuel using water rather than steam as depicted in the FIGURES. Accordingly, reference should be made to the appended claims, rather than to the foregoing specification, as indicating the scope of the invention.

What is claimed is:

1. A system for pre-heating fuel in a gas turbine engine, comprising:

a coolant supply;

a component in the turbine engine having a liner such that coolant flowing through said component surrounds said component and absorbs heat, wherein said liner has an inlet in flow communication with said coolant supply and an outlet for coolant to exit the liner; and, a heat exchanger having a flow path for coolant and a flow path for fuel, wherein said flow path for coolant is in flow communication with the component liner outlet and wherein said flow path for fuel is disposed within the flow path of fuel to the turbine engine combustor, such that heat is transferred from the coolant to the fuel, wherein said coolant supply provided by a heat recovery steam generator connected to an exhaust of the turbine engine.

2. A system as in claim 1 wherein said coolant is steam.

3. A system as in claim 1 wherein said component is a combustor.

4. A system as in claim 1 wherein said component is a transition.

5. A system as in claim 1 wherein said component is a transition/combustor combination.

* * * * *